United States Patent
Yu

(10) Patent No.: US 7,130,481 B2
(45) Date of Patent: Oct. 31, 2006

(54) APPARATUS FOR ATTENUATING IMAGE-NOISE ADAPTIVELY AND METHOD THEREOF

(75) Inventor: Pil-ho Yu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 713 days.

(21) Appl. No.: 10/247,625

(22) Filed: Sep. 20, 2002

(65) Prior Publication Data
US 2003/0123750 A1 Jul. 3, 2003

(30) Foreign Application Priority Data
Dec. 29, 2001 (KR) .............................. 2001-88225

(51) Int. Cl.
*G06K 9/40* (2006.01)
*H04N 5/217* (2006.01)
(52) U.S. Cl. ...................... 382/261; 348/620
(58) Field of Classification Search ........ 382/260–264, 382/275; 348/607, 620, 619, 618
See application file for complete search history.

(56) References Cited
U.S. PATENT DOCUMENTS 5,025,316 A * 6/1991 Darby ...................... 348/620
5,111,511 A * 5/1992 Ishii et al. .................. 382/107
5,384,865 A * 1/1995 Loveridge .................. 382/262
5,394,192 A * 2/1995 Hackett ...................... 348/619
5,574,512 A * 11/1996 Saeger ....................... 348/620
5,880,791 A * 3/1999 De Haan et al. ............ 348/607
6,067,125 A * 5/2000 May .......................... 348/607
6,094,231 A * 7/2000 Wischer-Mann ........... 348/607
6,115,502 A * 9/2000 De Haan et al. ............ 382/260
6,195,132 B1 * 2/2001 Kimura et al. ............. 348/618
6,259,489 B1 * 7/2001 Flannaghan et al. ........ 348/620

FOREIGN PATENT DOCUMENTS

KR    10-2003-0030505 A    4/2003

* cited by examiner

*Primary Examiner*—Kanjibhai Patel
(74) *Attorney, Agent, or Firm*—Sughrue Mion, PLLC

(57) ABSTRACT

A method of adaptively attenuating image-noise according to a degree of motion of an image signal and an apparatus therefor are provided. An input image signal is filtered in a spatial area to attenuate noise of the input image signal. The input image signal is filtered in a temporal direction to attenuate noise of the input image signal. A degree of motion of the input image signal is extracted each predetermined period. An image signal whose noise is spatially attenuated is mixed with an image signal whose noise is temporally attenuated according to the degree of motion of the input image signal and a mixed image signal is output.

11 Claims, 6 Drawing Sheets

APPARATUS FOR ATTENUATING IMAGE-NOISE ADAPTIVELY AND METHOD THEREOF

BACKGROUND OF THE INVENTION

1. Field of the Invention

The present invention relates to a system for attenuating noise of an image signal, and more particularly, to a method of attenuating image-noise adaptively according to a degree of motion in an image signal, and an apparatus therefor. The present application is based on Korean Patent Application No. 2001-88225, filed Dec. 29, 2001, which is incorporated herein by reference.

2. Description of the Related Art

FIG. 1 is a view of a three-dimensional image signal. Referring to FIG. 1, a plurality of frames of an image signal are arranged in a temporal direction. Each frame has a spatial area with a vertical component and a horizontal component.

FIG. 2 is a block diagram of a conventional apparatus for attenuating image-noise. Referring to FIG. 2, a spatial noise attenuator 110 attenuates noise of an image signal in a spatial area using a low-pass filter. A temporal noise attenuator 120 attenuates noise of the image signal output from the spatial noise attenuator 110 in a temporal direction using the low-pass filter.

Here, the spatial noise attenuator 110 attenuates radio frequency components as well as noise components, which causes damage to the image signal and results in reduced noise attenuation as the degree of motion of the image signal increases.

Accordingly, as shown in FIG. 1, if the spatial noise attenuator 110 and the temporal noise attenuator 120 are connected to each other, the spatial noise attenuator 110 damages the image signal regardless of the degree of motion of the image signal.

SUMMARY OF THE INVENTION

To solve the above-described problems, it is a first object of the present invention to provide a method of adaptively attenuating image-noise to attenuate noise of image signals and reduce a degree of damage to the image signals by adaptively mixing an image signal, whose noise is spatially attenuated, and an image signal, whose noise is temporally attenuated, according to the degree of motion of the image signals.

It is a second object of the present invention to provide an apparatus for adaptively attenuating image-noise which adopts the method of adaptively attenuating image-noise.

Accordingly, to achieve the first object, there is provided a method of adaptively attenuating noise of an image signal. An input image signal is filtered in a spatial area to attenuate noise of the input image signal. The input image signal is filtered in a temporal direction to attenuate noise of the input image signal. A degree of motion of the input image signal is extracted each predetermined period. An image signal whose noise is spatially attenuated is mixed with an image signal whose noise is temporally attenuated according to the degree of motion of the input image signal and a mixed image signal is output.

To achieve the second object, there is provided an apparatus for adaptively attenuating noise of an image signal including a spatial noise attenuator, a temporal noise attenuator, a motion detector, a first adder, a multiplier, and a second adder. The spatial noise attenuator filters an input image signal in a spatial area. The temporal noise attenuator filters the input image signal in a temporal direction. The motion detector detects a degree of a motion according to a difference value between the input image signal and an output image signal that is delayed for a predetermined period. The first adder generates a difference value between an image signal output from the spatial noise attenuator and an image signal output from the temporal noise attenuator. The multiplier multiplies the difference value obtained in the first adder and the degree of the motion detected in the motion detector together.

The second adder adds a value output from the multiplier and the image signal output from the temporal noise attenuator.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, a preferred embodiment of the present invention will be described with reference to the attached drawings.

Figure 3:
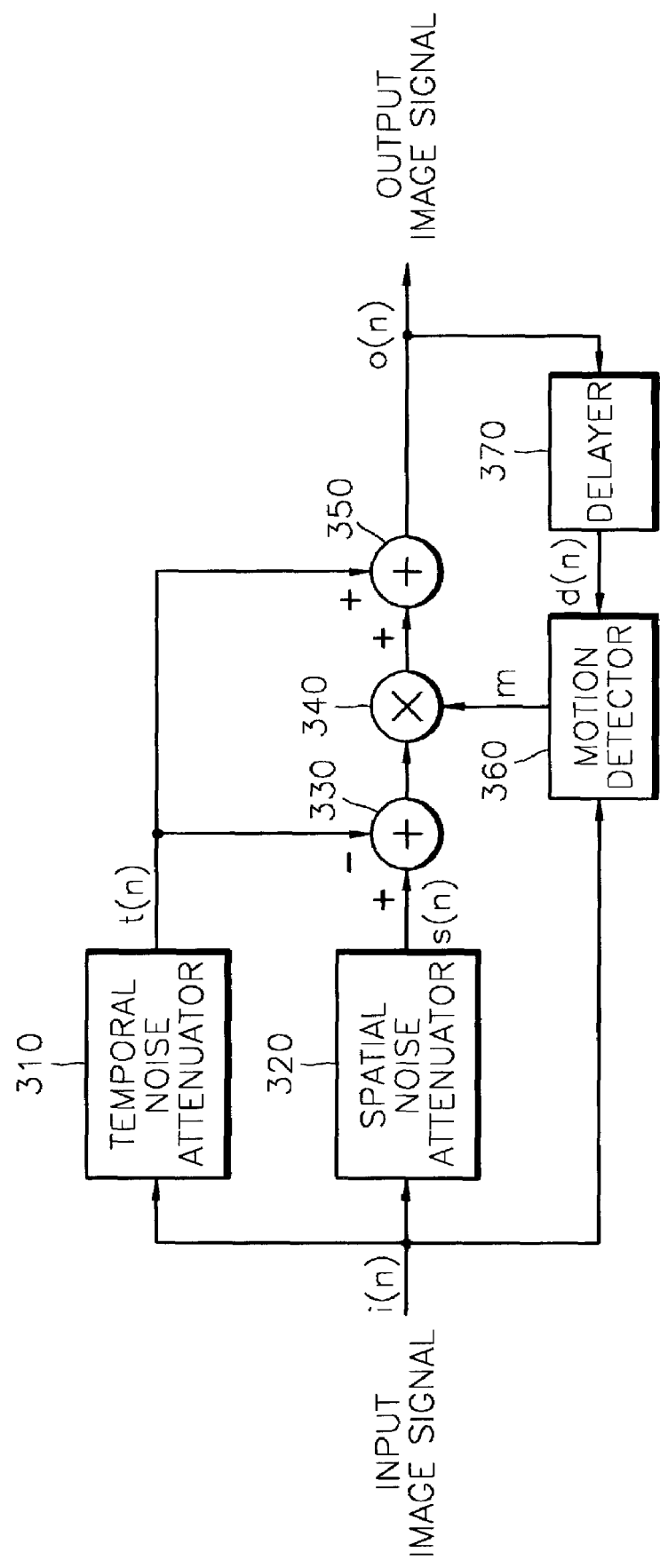
FIG. 3 is a block diagram of an apparatus for attenuating image-noise adaptively according to the present invention.

FIG. 3 is a block diagram of an apparatus for adaptively attenuating image-noise according to the present invention. Referring to FIG. 3, the apparatus includes a spatial noise attenuator 320, a temporal noise attenuator 310, a delayer 370, a motion detector 360, a first adder 330, a multiplier 340, and a second adder 350. The spatial noise attenuator 320 low-pass filters an image signal i(n) in a spatial area. The temporal noise attenuator 310 low-pass filters the image signal i(n) in a temporal direction. The delayer 370 delays an output image signal for a predetermined period. The motion detector 360 outputs a weight m corresponding to a degree of motion of the input image signal. The first adder 330 adds an image signal output from the spatial noise attenuator 320 and an image signal output from the temporal noise attenuator 310. The multiplier 340 multiplies an addition value of the first adder 330 by the weight m. The second adder 350 adds a value output from the multiplier 340 and a value output from the temporal noise attenuator 310.

The operation of the apparatus having the above-described structure, for attenuating image-noise will be described.

Figure 1:
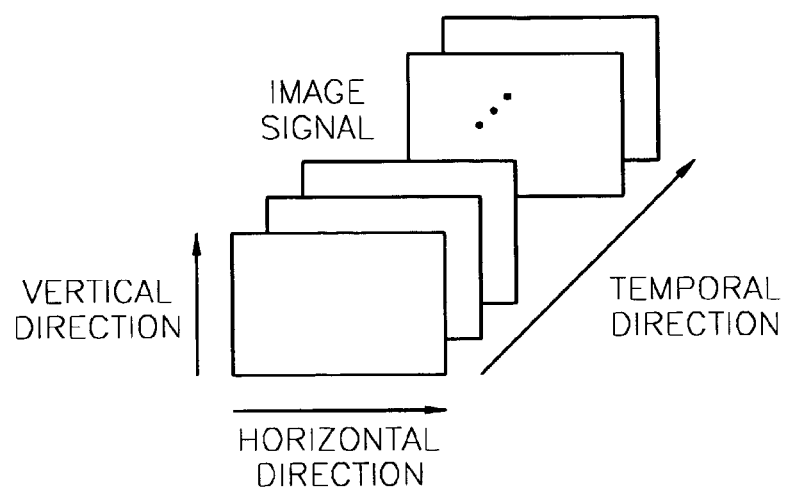
FIG. 1 is a view of a three-dimensional image signal.
Figure 2:
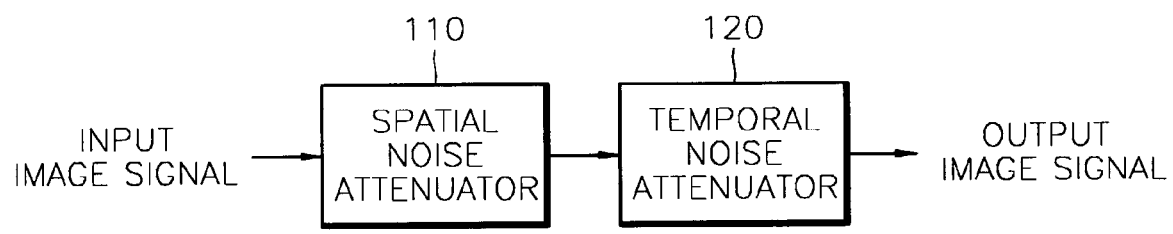
FIG. 2 is a block diagram of a conventional apparatus for attenuating image-noise.

The spatial noise attenuator 320 low-pass filters the input image signal i(n) in the spatial area, as shown in FIG. 2, and outputs an image signal s(n) whose noise is attenuated.

The temporal noise attenuator 310 low-pass filters the input image signal i(n) in the temporal direction, as shown in FIG. 2, and outputs an image signal t(n) whose noise is attenuated.

The delayer 370 delays an output image signal o(n) for a predetermined period, e.g., for a frame, and outputs a delayed image signal d(n).

The motion detector 360 compares the input image signal i(n) with the delayed image signal d(n) and generates the weight m for indicating the degree of motion of the image signal i(n) by predetermined period, e.g., by frame.

The first adder 330 subtracts the image signal t(n) output from the temporal noise attenuator 310 from the image signal s(n) output from the spatial noise attenuator 320.

The multiplier 340 multiplies an image signal output from the first adder 330 and the weight m extracted from the motion detector 360 together.

The second adder 350 adds an image signal output from the multiplier 340 and the image signal t(n) output from the temporal noise attenuator 310 to generate the output image signal o(n). Here, the process of generating the output image signal o(n) can be represented by formula 1:

$$o(n)=m\times(s(n)-t(n))+t(n)=m\times s(n)+(1-m)\times t(n) \quad (1)$$

where the weight m output from the motion detector 360 has values of 0 –1, the weight m of 0 represents the motion of the image signal does not occur and the degree of the motion of the image signal increases as the weight m increases. Thus, as the weight m increases, the image signal s(n) whose noise is spatially attenuated, is output. In contrast, as the weight m decreases, the image signal t(n) whose noise is temporally attenuated is output.

Figure 4:
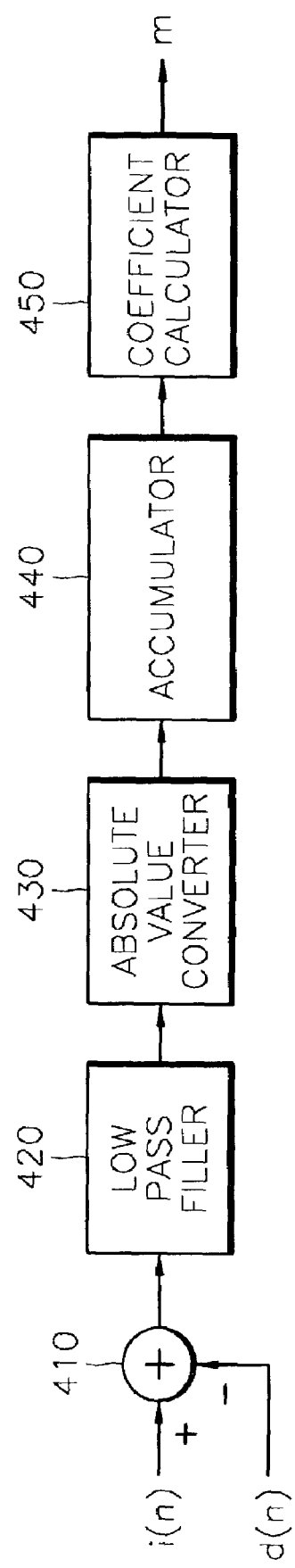
FIG. 4 is a detailed block diagram of a motion detector shown in FIG. 3.

FIG. 4 is a detailed block diagram of the motion detector 360 shown in FIG. 3. Referring to FIG. 4, a third adder 410 outputs a difference value between the input image signal i(n) and the image signal d(n) delayed in the delayer 370.

A low-pass filter 420 low-pass filters the difference value calculated in the third adder 410 to output low-pass components. An absolute value converter 430 converts difference values of the low-pass components filtered in the low-pass filter 420 into absolute values. An accumulator 440 accumulates absolute values by predetermined period, e.g., by a frame. A coefficient calculator 450 generates a weight m according to the accumulated values every frame.

Figure 5:
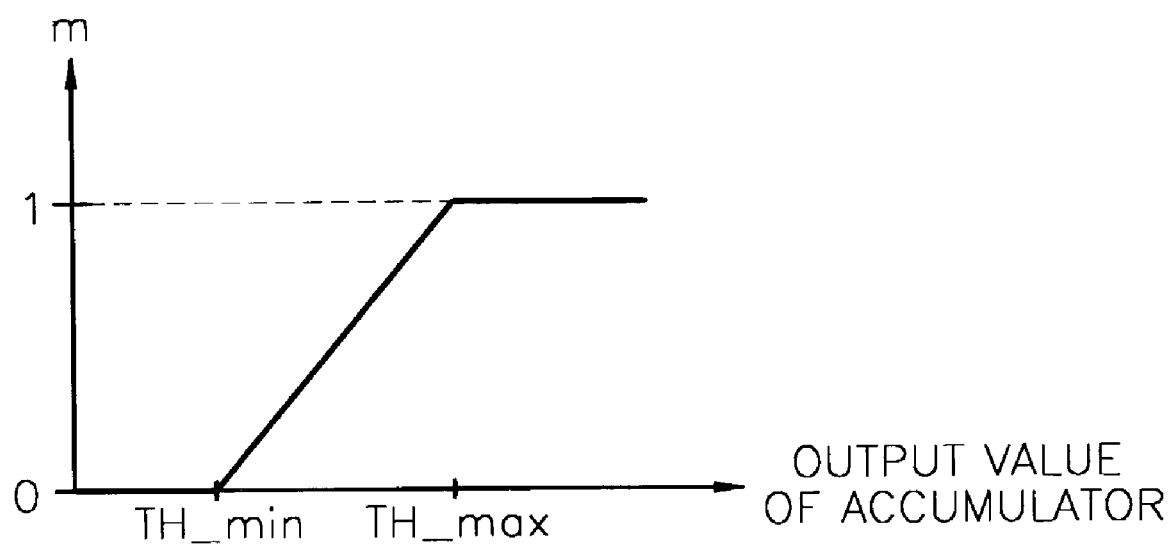
FIG. 5 is a graph showing a relationship between input and output of a coefficient calculator shown in FIG. 4.

FIG. 5 is a graph showing a relationship between input and output of the coefficient calculator 450 shown in FIG. 4. Referring to FIG. 5, the X-coordinate represents the accumulated values of the accumulator 440. The Y-coordinate represents the weight m. TH_min represents the minimum threshold of the accumulated values where the weight m is 0, and TH-max represents the maximum threshold of the accumulated values where the weight m is 1. For example, TH-min and TH-max may be determined as predetermined values or may be adjusted according to horizontal and vertical sizes of a spatial area.

Figure 6:
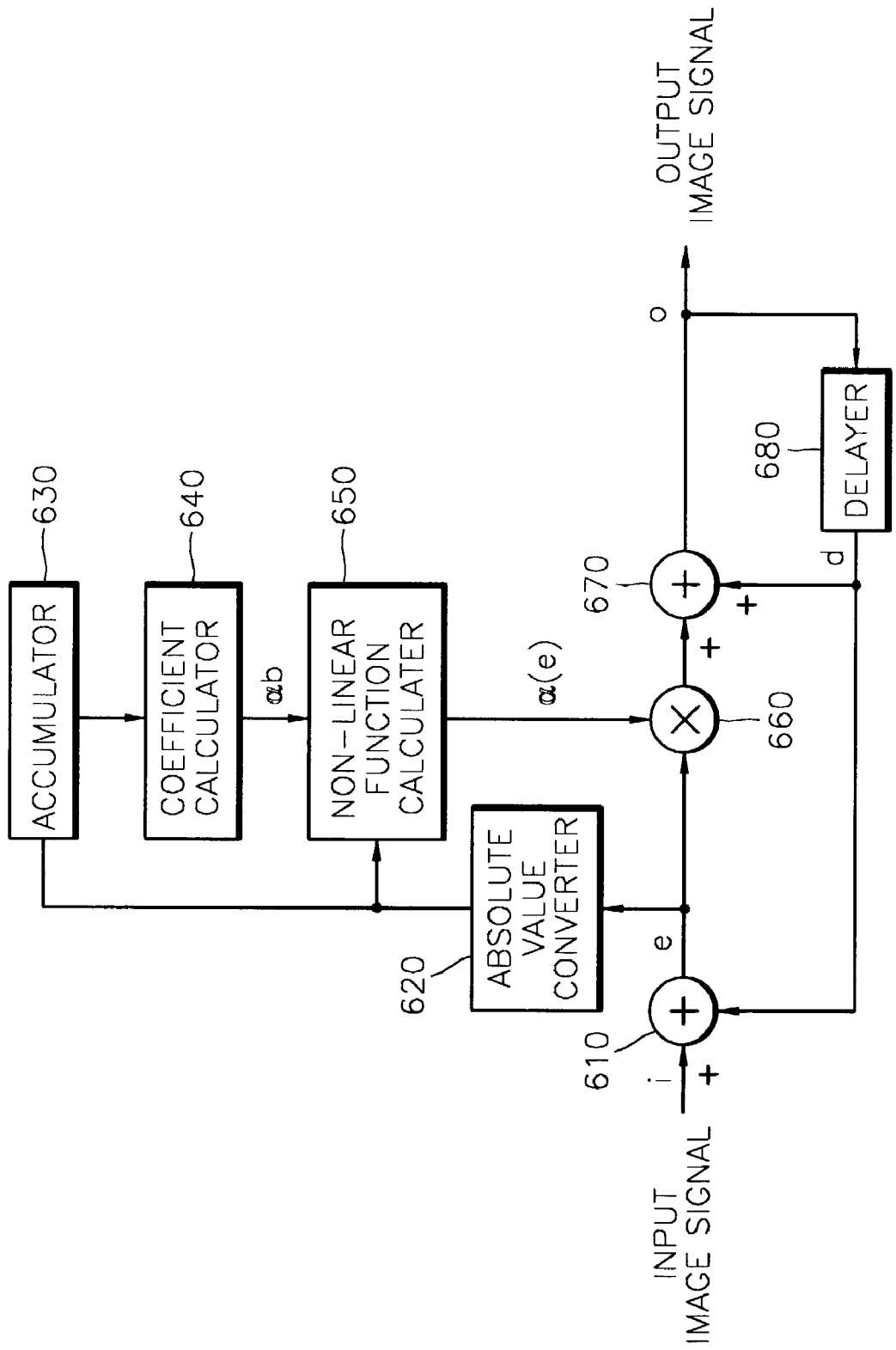
FIG. 6 is a block diagram of a temporal noise attenuator shown in FIG. 3 according to an embodiment of the present invention.

FIG. 6 is a block diagram of the temporal noise attenuator 310 shown in FIG. 3 according to an embodiment of the present invention. Referring to FIG. 6, a delayer 680 delays an output image signal for a predetermined period.

A fourth adder 610 outputs a difference value e between an input image signal i and an image signal d delayed in the delayer 610.

An absolute value converter 620 converts the difference value e calculated in the fourth adder 610 into an absolute value.

An accumulator 630 accumulates absolute values converted in the absolute value converter 620 by predetermined period, e.g., by frame.

Figure 7:
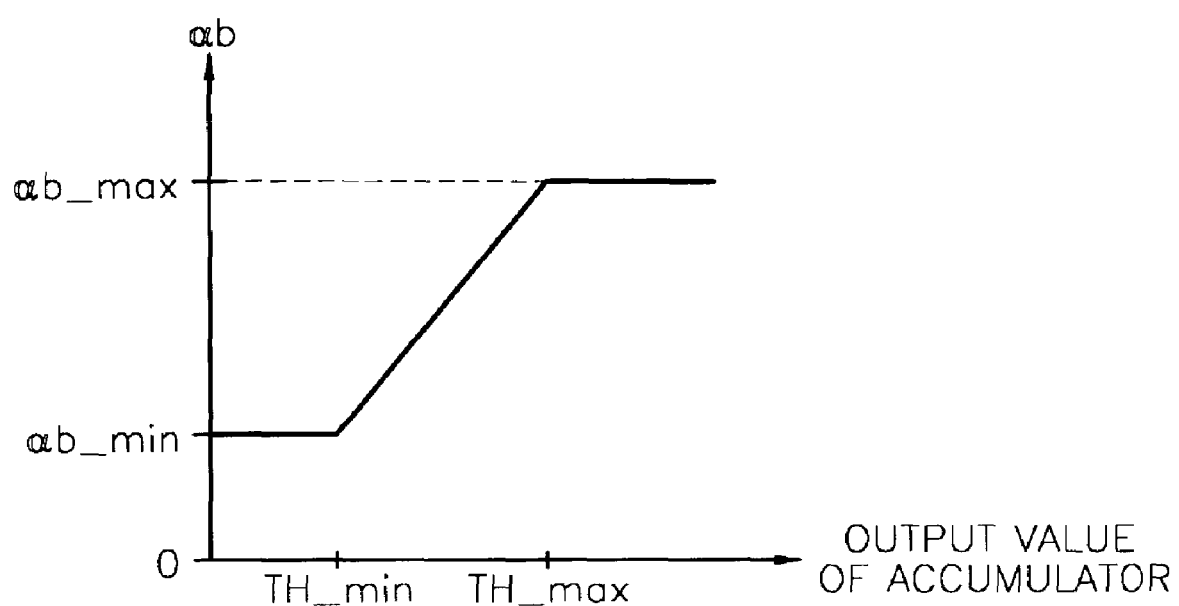
FIG. 7 is a graph showing a relationship between input and output of a coefficient calculator shown in FIG. 6.

A coefficient calculator 640 receives the accumulated values from the accumulator 630, as shown in FIG. 7, and calculates a minimum coefficient αb which can change a weight α(e). In other words, if the accumulated values of the accumulator 630 are smaller than TH-min, the coefficient calculator 640 calculates αb_min as the minimum coefficient αb. If the accumulated values of the accumulator 630 are greater than TH_max, the coefficient calculator 640 calculates αb_max as the minimum coefficient αb. Here, TH_min and TH_max are adjustable, and preferably, αb_min is set to about 0.1 and αb_max is set to about 0.5. Also, if the accumulated values of the accumulator 630 exist between TH-min and TH-max, the coefficient calculator 640 calculates a minimum value αb which is proportional to the accumulated values.

A non-linear function calculator 650 non-linearly calculates a weight α(e) based on the minimum coefficient αb constituted in the coefficient calculator 640 and the absolute value output from the absolute value converter 620.

A multiplier 660 multiplies the difference value e output from the fourth adder 610 and the weight α(e) calculated in the non-linear function calculator 650 together.

A fifth adder 670 adds a signal output from the multiplier 660 and the image signal d delayed in the delayer 680 to output an image signal o. Thus, as shown in FIG. 6, the degree of noise attenuation depends on the degree of motion detected from motion detecting means (the accumulator 630, the coefficient calculator 640, and the non-linear function calculator 650). In other words, if the degree of motion of an image signal is great, more weight is placed on a current input pixel, and if the degree of motion of an image signal is small, more weight is placed on an output pixel that is delayed for a predetermined period, thereby attenuating noise.

As described above, according to the present invention, an image signal whose noise is spatially attenuated is adaptively mixed with an image signal whose noise is temporally attenuated according to the degree of motion of the image signals. As a result, damage to the image signals can be reduced with adaptive attenuation of noise of the image signals according to the degree of motion of the image signals.

What is claimed is:

1. A method of adaptively attenuating noise of an image signal, the method comprising:
   (a) filtering an input image signal in a spatial area to attenuate noise of the input image signal;
   (b) filtering the input image signal in a temporal direction to attenuate noise of the input image signal;
   (c) extracting a degree of motion of the input image signal each predetermined period; and
   (d) mixing an image signal whose noise is spatially attenuated with an image signal whose noise is temporally attenuated according to the degree of the motion of the input image signal and outputting a mixed image signal,
   wherein step (c) comprises:
   obtaining a difference value between the input image signal and an output image signal that is delayed for a predetermined period; and
   accumulating the difference value each predetermined period and extracting accumulated values as degrees of motion.

2. The method of claim 1, wherein in step (d), if the degree of the motion of the image signal is great, more weight is placed on the image signal whose noise is spatially attenuated and if the degree of the motion of the image signal is small, more weight is placed on the image signal whose noise is temporally attenuated.

3. The method of claim 1, wherein the process of generating the output image signal is represented by the formula:

$$o(n)=m \times s(n)+(1-m) \times t(n)$$

where m represents the degree of motion of an image signal, s(n) represents the image signal whose noise is spatially attenuated, and t(n) represents the image signal whose noise is temporally attenuated.

4. A method of attenuating noise of an image signal, the method comprising:
   (a) accumulating a difference value between an input image signal and a delayed output image signal for a predetermined period and extracting a degree of a motion; and
   (b) adjusting weights of the input image signal and the delayed output image signal according to the degree of the motion.

5. The method of claim 4, wherein in step (b), more weight is placed on the input image signal if the degree of the motion of the image signal is great and more weight is placed on the delayed output image signal if the degree of the motion of the image signal is small.

6. An apparatus for adaptively attenuating noise of an image signal, the apparatus comprising:
   a spatial noise attenuator for filtering the input image signal in a spatial area;
   a temporal noise attenuator for filtering the input image signal in a temporal direction;
   a motion detector for detecting a degree of motion according to a difference value between the input image signal and an output image signal that is delayed for a predetermined period;
   a first adder for generating a difference value between an image signal output from the spatial noise attenuator and an image signal output from the temporal noise attenuator;
   a multiplier for multiplying the difference value obtained in the first adder and the degree of the motion detected in the motion detector together; and
   a second adder for adding a value output from the multiplier and the image signal output from the temporal noise attenuator.

7. The apparatus of claim 6, wherein the motion detector comprises:
   a third adder for generating a difference value between the input image signal and the output image signal that is delayed for a predetermined period;
   a filter for filtering the difference value generated in the third adder to output low-pass components;
   an absolute value converter for converting the difference value filtered in the filter into an absolute value; and
   an accumulator for accumulating absolute values converted in the absolute value converter by the predetermined period; and
   a coefficient calculator for receiving the accumulated values from the accumulator to calculate a degree of motion.

8. The apparatus of claim 7, wherein the coefficient calculator stores a minimum threshold and a maximum threshold of the degree of motion according to the accumulated values.

9. A method for adaptively attenuating noise of an image signal, the method comprising:
   filtering the input image signal in a spatial area;
   filtering the input image signal in a temporal direction;
   detecting a degree of motion according to a difference value between the input image signal and an output image signal that is delayed for a predetermined period;
   generating a difference value between an image signal output from the spatial noise attenuator and an image signal output from the temporal noise attenuator;
   multiplying the difference value obtained in the first adder and the degree of the motion detected in the motion detector together; and
   adding a value output from the multiplier and the image signal output from the temporal noise attenuator.

10. The method of claim 9 further comprising:
   generating a difference value between the input image signal and the output image signal that is delayed for a predetermined period;
   low-pass filtering the difference value;
   converting the difference value filtered in the low-pass filter into an absolute value;
   accumulating the absolute values over the predetermined period; and
   calculating a degree of motion according to the accumulated absolute values.

11. The method of claim 10, further comprising storing a minimum threshold and a maximum threshold of the degree of motion according to the accumulated absolute values.

* * * * *